(12) United States Patent
Helgerson et al.

(10) Patent No.: US 7,748,520 B1
(45) Date of Patent: Jul. 6, 2010

(54) SLIP ROLLER CONVEYOR

(75) Inventors: David E. Helgerson, Plymouth, MN (US); Brian D. Koenig, Hastings, MN (US)

(73) Assignee: Activar Technical Products Group, Inc., Hopkins, MN (US)

( * ) Notice: Subject to any disclaimer, the term of this patent is extended or adjusted under 35 U.S.C. 154(b) by 14 days.

(21) Appl. No.: 12/235,800

(22) Filed: Sep. 23, 2008

(51) Int. Cl.
*B65G 13/06* (2006.01)
(52) U.S. Cl. .................. 198/781.03; 198/790; 198/817
(58) Field of Classification Search ............ 198/781.03, 198/781.04, 781.09, 781.1, 790, 817
See application file for complete search history.

(56) References Cited

U.S. PATENT DOCUMENTS

| | | | |
|---|---|---|---|
| 5,261,884 A * | 11/1993 | Stern et al. ................. | 604/154 |
| 5,558,205 A | 9/1996 | Helgerson et al. | |
| 5,558,206 A * | 9/1996 | Helgerson et al. ...... | 198/781.04 |
| 5,971,137 A * | 10/1999 | Grant et al. ................. | 198/782 |
| 6,422,378 B1 * | 7/2002 | Allgaier ................. | 198/781.03 |
| 6,814,222 B2 * | 11/2004 | Henson et al. ......... | 198/781.06 |

\* cited by examiner

*Primary Examiner*—James R Bidwell
(74) *Attorney, Agent, or Firm*—James J. Paige; Nikolai & Mersereau, P.A.

(57) ABSTRACT

In some embodiments, a conveyor may include one or more of the following features: (a) a plurality of driven roller assemblies mounted on said side walls in spaced relationship and at uniform height along the lengthwise direction of said pathway, each said driven roller assembly may include one or more of the following features: i) a center shaft mounted in the side wall so said center shaft is fixed against rotation and projects, perpendicularly inward from the inside surface of the side wall, ii) a driven pulley having an outer flange, an inner axial bore of a size permitting said driven pulley to slide axially over the center shaft, and iii) a roller carried on said driven pulley for rotation therewith to move articles resting on said roller down said pathway, said roller having a recess for engaging a catch on the driven pulley to hold the roller securely.

19 Claims, 3 Drawing Sheets

SLIP ROLLER CONVEYOR

FIELD OF THE INVENTION

Embodiments of the present invention generally relate to the transfer of articles. Particularly, embodiments of the present invention relate to moving articles along a pathway. More particularly, embodiments of the present invention relate to conveyor technology.

BACKGROUND

A belt conveyor consists of two, or more pulleys, with a continuous loop of material, the conveyor belt, rotating about them. One or both of the pulleys, are powered, moving the belt and the material on the belt forward. The powered pulley is called the drive pulley while the un-powered pulley is called the idler. There are two main industrial classes of belt conveyors; those in general material handling, such as those moving boxes along, inside a factory, and bulk material handling, such as those used to transport industrial and agricultural materials generally in outdoor locations, such as gain, coal, ores, etc. Generally companies providing general material handling type belt conveyors do not provide the conveyors for bulk material handling. In addition there are a number of commercial applications of belt conveyors such as those in grocery stores.

The belt consists of one or more layers of material. Many belts in general material handling have two layers. An under layer of material to provide linear strength and shape called a carcass and an over layer called the cover. The carcass is often a cotton or plastic web or mesh. The cover is often various rubber or plastic compounds specified by use of the belt. Covers can be made from more exotic materials for unusual applications such as silicone for heat or gum rubber when traction is essential.

Material flowing over the belt may be weighed in transit using a beltweigher. Belts with regularly spaced partitions, known as elevator belts, are used for transporting loose materials up steep inclines. Belt Conveyors are used in self-unloading bulk freighters and in live bottom trucks. Conveyor technology is also used in conveyor transport such as moving sidewalks or escalators, as well as on many manufacturing assembly lines. Stores often have conveyor belts at the checkout counter to move shopping items. Ski areas also use conveyor belts to transport skiers up the hill. A wide variety of related conveying machines, differing in principle of operation and means and direction of conveyance, are available including: screw conveyors, vibrating conveyors, pneumatic conveyors, the moving floor system, which uses reciprocating slats to move cargo, and roller conveyor systems, which use a series of powered rollers to convey boxes or pallets.

Conveyors are used as components in automated distribution and warehousing. In combination with computer controlled pallet handling equipment this allows for more efficient retail, wholesale, and manufacturing distribution. It is, considered a labor saving system allowing large volumes to move rapidly through a process, allowing companies to ship or receive higher volumes with smaller storage space and with, less labor expense.

Conveyor systems have employed design features of a rather complex nature making the systems difficult to disassemble when the need arises for repair or replacement of a broken or worn part. The known designs have relied upon tested and true fastening, assembly elements and their relationships and functions, even as the technology has inched forward with better arrangements for rollers, shafts, sleeves, and the like.

Simplification of the relationships between the parts and the reduction of parts is desired; imparting multiple functions for the simplified parts is also desired.

SUMMARY OF THE INVENTION

In some embodiments, a conveyor may include one or more of the following features: (a) a pair of laterally spaced side walls extending in a lengthwise direction of a conveyor pathway, each said side wall having an inside surface facing said pathway and an outside surface facing away from said pathway, (b) a plurality of driven roller assemblies mounted on said side walls in spaced relationship and at uniform height along the lengthwise direction of said pathway, each said driven roller assembly may include one or more of the following features: i) a center shaft mounted in the side wall so said center shaft is fixed against rotation, and projects perpendicularly inward from the inside surface of the side wall, said center shaft being characterized by having a socket head, ii) a driven pulley having an outer flange, an inner axial bore of a size permitting said driven pulley to slide axially over the center shaft, said driven pulley being mounted on said center shaft in a manner allowing rotation of said driven pulley, iii) a roller carried on said driven pulley for rotation therewith to move articles resting on said, roller down said pathway, said roller having a recess for engaging a catch on the driven pulley to hold the roller securely, and (c) a drive system including an endless drive belt engaged with said driven pulleys to effect rotation thereof.

In some embodiments, a conveyor may include one or more of the following features: (a) a pair of laterally spaced side walls extending in a lengthwise direction of a conveyor pathway, (b) a plurality of driven roller assemblies mounted on each said side wall along the lengthwise direction of said pathway, each said driven roller assembly may include one or more of the following features: i) a center shall mounted in the side wall to project perpendicularly inward from an inside surface of the side wall, ii) a driven pulley having axially extending teeth and grooves in its circumferential outer periphery, iii) a roller operably coupled on said driven pulley for rotation therewith to move articles resting on said roller down said pathway, iv) a center bore within the roller having a recessed portion along a circumference of the center bore, v) a catch mechanism along a circumference of the driven pulley, vi) a lip portion on the driven pulley for mounting the driven pulley between the center shaft and the inner surface of the side wall, vii) a flange on the driven pulley for coupling the drive belt between the flange and the inner surface of the side wall, and (c) a drive system including, an endless positive drive belt having an outside edge and a positive drive surface formed of transverse teeth and grooves which mesh with the axially extending teeth and grooves of said driven rotatable pulleys along a straight drive run.

In some embodiments, a slip roller conveyor may include one or more of the following features: (a) a pair of laterally spaced parallel side walls extending in a lengthwise direction of a conveyor pathway, b) a plurality of driven slip roller assemblies mounted on at least one the pair of side walls; each said driven slip roller assembly may include one or more of the following: i) a non-rotatable center shaft coupled to the side wall projecting perpendicularly inward from an inside surface of the side wall, ii) a rotatable pulley having axially extending teeth and grooves and having an inner axial bore of a size permitting said rotatable pulley to slide axially over said center shaft, iii) a slip roller carried on said rotatable pulley for slip friction rotation therewith subject to non-rotation therewith when a force obstructing rotation of said slip roller exceeds a friction effecting rotation of said slip roller, iv) the center shaft holding upon it the rotatable pulley pinched between the inside surface of the side wall and the center shaft and the slip roller coupled to the rotatable pulley; v) a center bore within the slip roller having a recessed portion along a circumference of the center bore vi) a catch mechanism along a circumference of the rotatable pulley, vii) a lip portion on the rotatable pulley for mounting the rotatable pulley between the center shaft and the inner surface of the side wall, viii) a flange on the rotatable pulley for coupling the rotatable pulley between the flange and the inner surface of the side wall, and c) a drive system including an endless positive drive belt having an inside edge and an outside edge and a positive drive surface therebetween.

DESCRIPTION OF THE EMBODIMENT

Figure 1:
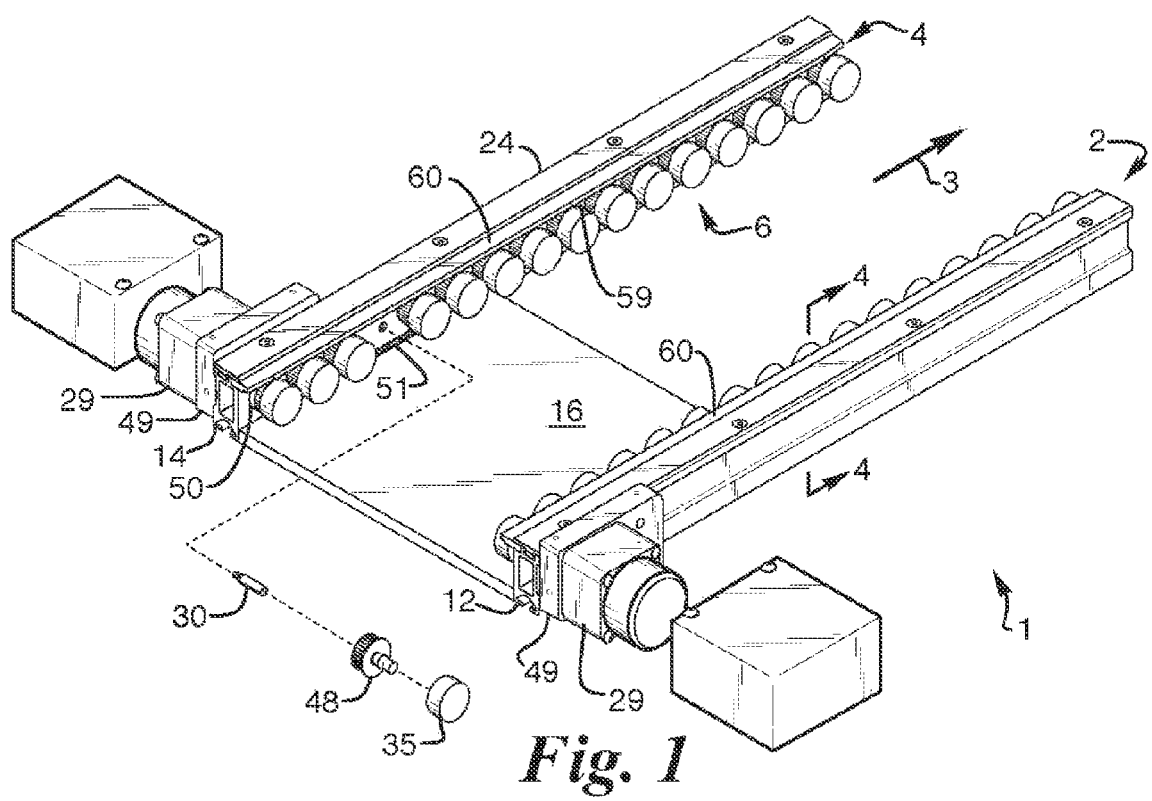
FIG. 1 is a schematic perspective view of a conveyor in an embodiment of the present invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the Figures, in which like elements in different Figures have, like reference numerals. The Figures, which are not necessarily to scale, depict selected embodiments and are not intended to limit the scope of the present teachings. Skilled artisans will recognize the examples provided herein have many useful alternatives and fall within the scope, of the present teachings.

Figure 2:
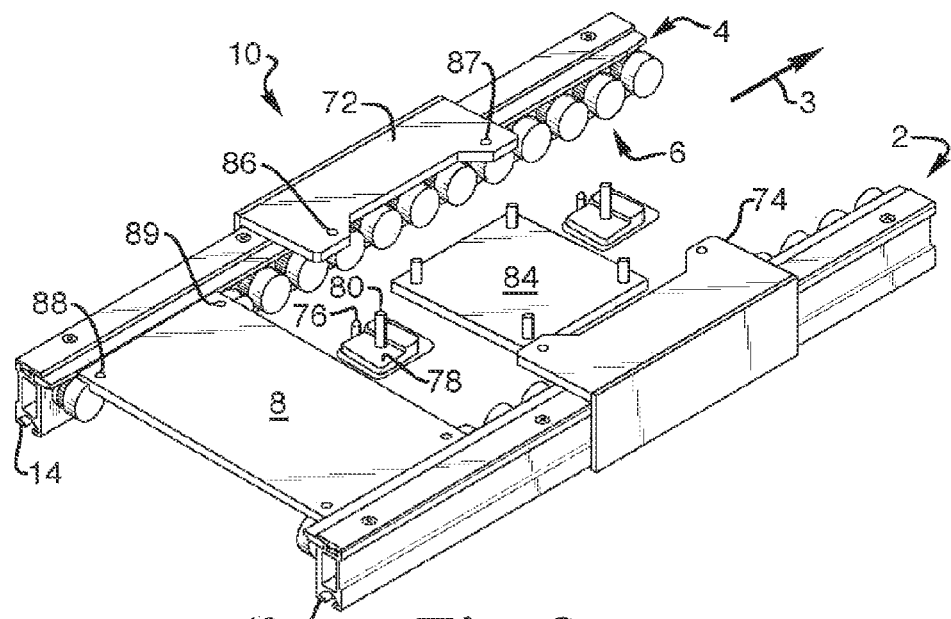
FIG. 2 is a schematic perspective fragmentary view of a conveyor in an embodiment of the present invention.
Figure 4:
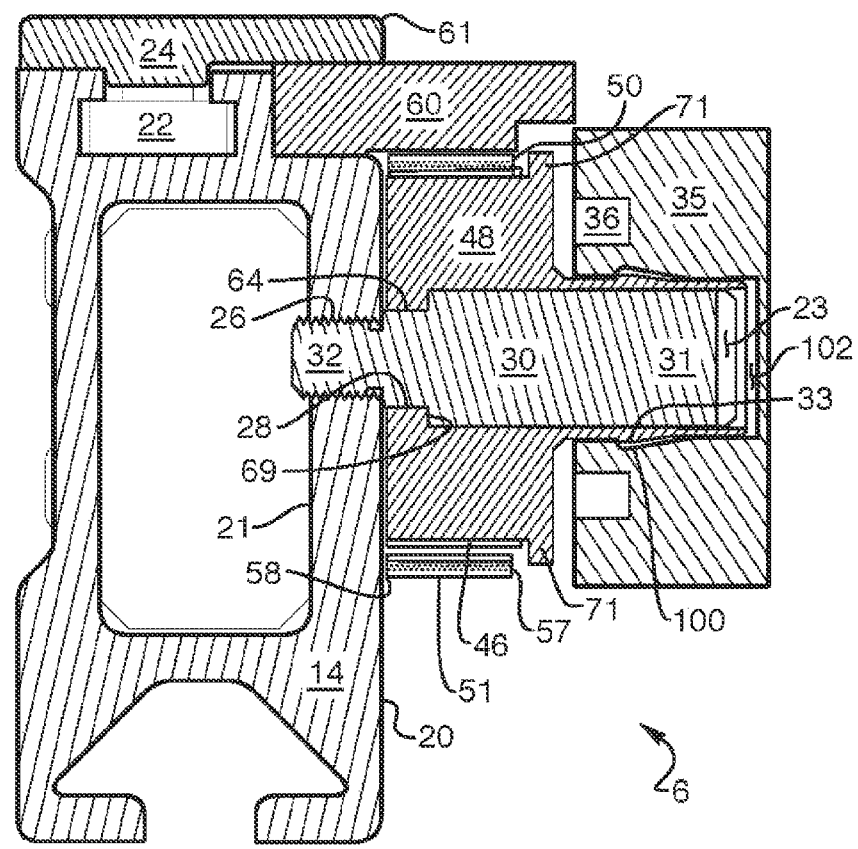
FIG. 4 is a schematic cross-sectional view taken on line 4-4 of FIG. 1 showing a conveyor assembly in an embodiment of the invention.

Referring particularly to FIGS. 1, 2, and 4, a roller conveyor 1 in an embodiment of the invention can have a left 4 and right 2 bank of roller assemblies 6. Conveyor 1 moves articles or product carriers 8 along its pathway 3. Pathway 3 may include one or more docking stations 10 where some sort of operation is performed on the article. The structure of conveyor 1 includes a pair of laterally spaced side walls 12, 14 extending in a lengthwise direction of conveyor pathway 3 and walls 12 and 14 define the maximum width of conveyor pathway 3. It is contemplated the width of conveyor pathway 3 can be most any width even an adjustable width without departing from the spirit of the invention. Side walls 12 and 14 can be held at a predetermined spacing by one or more transverse spacer plates 16. Spacer plates 16 may abut and be fastened to side walls 12 and 14 by any suitable means. Each side wall 12, 14 has mounted in it a plurality of driven roller assemblies 6 in spaced relationship and at uniform height, along the lengthwise direction of conveyor pathway 3.

Figure 3:
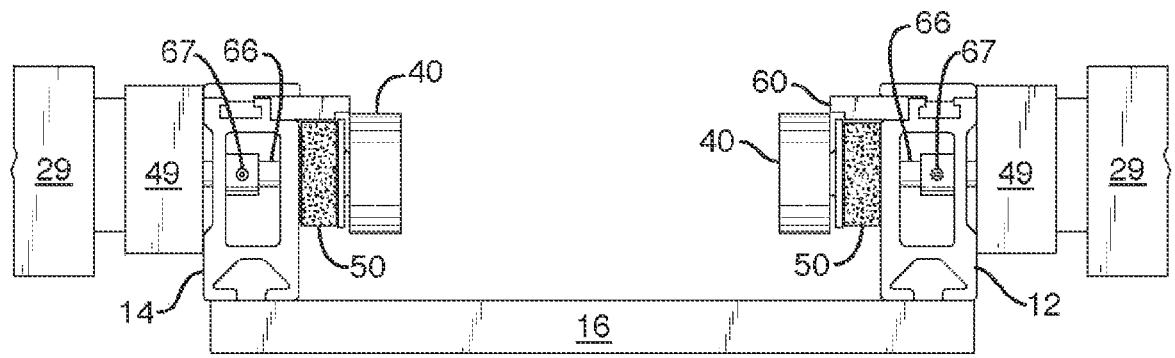
FIG. 3 is a schematic end view of a conveyor in an embodiment of the present invention.

Driven roller assemblies 6 can support lateral portions of articles or product carriers 8 moved along pathway 3. Each driven assembly 6 can have a central shaft 30, a rotatable driven pulley 48 and a roller 35 for supporting articles moved along pathway 3 of conveyor 1. A drive system (discussed in more detail below) can be provided for effecting rotation of driven pulleys 48 and rollers 35. The drive system can have an endless drive belt 50 (see FIGS. 1 and 3). Such a belt 50 can be adjacent each side wall 12, 14 of conveyor 1.

With reference to FIG. 4, the features of each side wall 12 and 14 and the components mounted thereon are similar (but inversely oriented), and therefore the following description of details for side wall 14 applies in most, essential aspects to side wall 12. Side wall 14 functions as a base all frame. It has opposite surfaces, including an inside surface 20 (e.g., facing in towards pathway 3) and an outside surface 21. It may be provided with, a rail slot 22 which can receive an upper rail portion 24. A guide strip 60 is located next to rail slot 22 and lip or hook 61 holding guide strip 60 in place along the top edge of side wall 14. Any suitable fastener may fix the guide strip 60 in such mounted condition up to and including permanent fixation such as welding without departing, from the spirit of the invention. A threaded bore 26 is located in a middle inner portion of side wall 14 to receive central shaft 30. Central shaft 30 can be screwed into bore 26 with inverse but matching threads located on insert 32 on center shaft 30. Center shaft 30 can be screwed into bore 26 securely to abut side wall 14 with middle portion 28 of center shaft 30. It is understood center shaft 30 could be inserted into side wall 14 in most any manner, such as snap fitting, without departing from the spirit of the invention. Center shaft 30 can have a socket head 23 which can be used with a socket wrench to rotate center shaft 30 into bore 26 and out of bore 26. This mounting provides a secure connection between side wall 14 and center shaft 30. It is contemplated center shaft 30 could have most any type of head, such as a Phillips or standard screw head, without departing from the spirit of the invention. Side walls 12 and 14 can be made of metal such as steel or aluminum; however, walls of plastics such as nylon or most any other material are fully contemplated without departing from the spirit of the invention.

Lip portion 69 retains driven pulley 48. When center shaft 30 is screwed into place, lip portion 69 catches base portion 64 of driven pulley 48. This retains driven pulley 48 adjacent to side wall 14. Flange 71 acts to retain belt 50 from moving horizontally. Thus when putting roller assembly 6 together, the installer could place driven pulley 48 over center shaft 30. Center shaft 30 could then be screwed into sidewall 14 in bore 26 until center shaft stops, rotating. Roller 35 could then be placed upon driven pulley 48 as is discussed in more detail below.

Driven roller assemblies 6 can be slip roller assemblies. Although fixed rollers may be employed in making an entire conveyor and are sometimes suitable at intervals between slip roller assemblies. Fixed rollers lacking the slip property exert an unrelenting drive force on articles supported on them.

Illustratively, a plurality of driven slip roller assemblies 6 (see FIG. 1) are mounted on each side wall 12 and 14 in spaced relationship to each other in a straight line in pathway lengthwise direction 3. Such roller assemblies 6 may be spaced at varying distance from each other along a side wall 12 and 14. A useful spacing for small conveyors for the electronics industry has been found to be about one inch (about 2.5 cm) on center however distances smaller than one inch can be used as well. For medium conveyors a good distance can be between 1 inch to 2 inches with 1.5 inches being, most common. In large conveyors a good distance can be 2 inches or greater depending on what is being conveyed on the conveyor. Greater or lesser spacing and larger or smaller roller assemblies may be employed. Rollers 35 of a side wall 12 and 14 are helpfully (but not critically) in an opposing relationship to roller, assemblies 6 mounted, on other side wall 14 or 12. Each side wall 12 and 14 has a bank of roller assemblies 6. A bank will usually have at least five roller assemblies 6, and usually will have at least 20, 30 or more all driven by a single drive belt 50 extending the entire length of the bank. Between the lateral banks of roller assemblies 6 is a substantially unobstructed space where optional accessories such as, for example, a docking station 10 may be installed.

Referring particularly to FIGS. 1 and 4, each driven roller assembly 6 has a center shaft 30 supporting it Center shaft 30 is of uniquely simplified design. It has an expanded head 31 at its inwardmost end (e.g., end extending inwardly from side wall 12 or 14). A notched middle portion 28 lies between expanded head 31 and insert 32. Insert 32 is of a smaller diameter and length than the expanded head 31. Bore 26 has a minimally larger diameter than insert 32 so insert 32 can be screwed within bore 26. This in turn effectively causes center shaft 30 to project perpendicularly inward from inside surface 20 of side wall 12 or 14. This mounting of center shaft 30 in side wall 12 or 14 effectively prevents center shaft 30 from rotating. However, rotation of center shaft 30 is contemplated it is unimportant (although a rotatable mounting, for a center shaft 30 in a side wall 12 or 14 may be optional). Center shaft 30 can be metal shafts such as those of stainless steel or aluminum, however, plastic shafts such as those of nylon or polyamides may be employed without departing from the spirit of the invention. It is of note, the round stock center shaft 30 is lathed out of a material, such as metal or hard plastic and is less expensive compared to other conveyor systems which utilized a hex bolt. The hex bolt had to be machined down substantially along the shaft, which wastes material and adds cost due to the machining. Center shaft 30 requires minimal machining thus reducing the cost of center shaft 30. Further, the hex head bolt would often times create debris due to the head of the bolt rubbing against the drive pulley.

Figure 5:
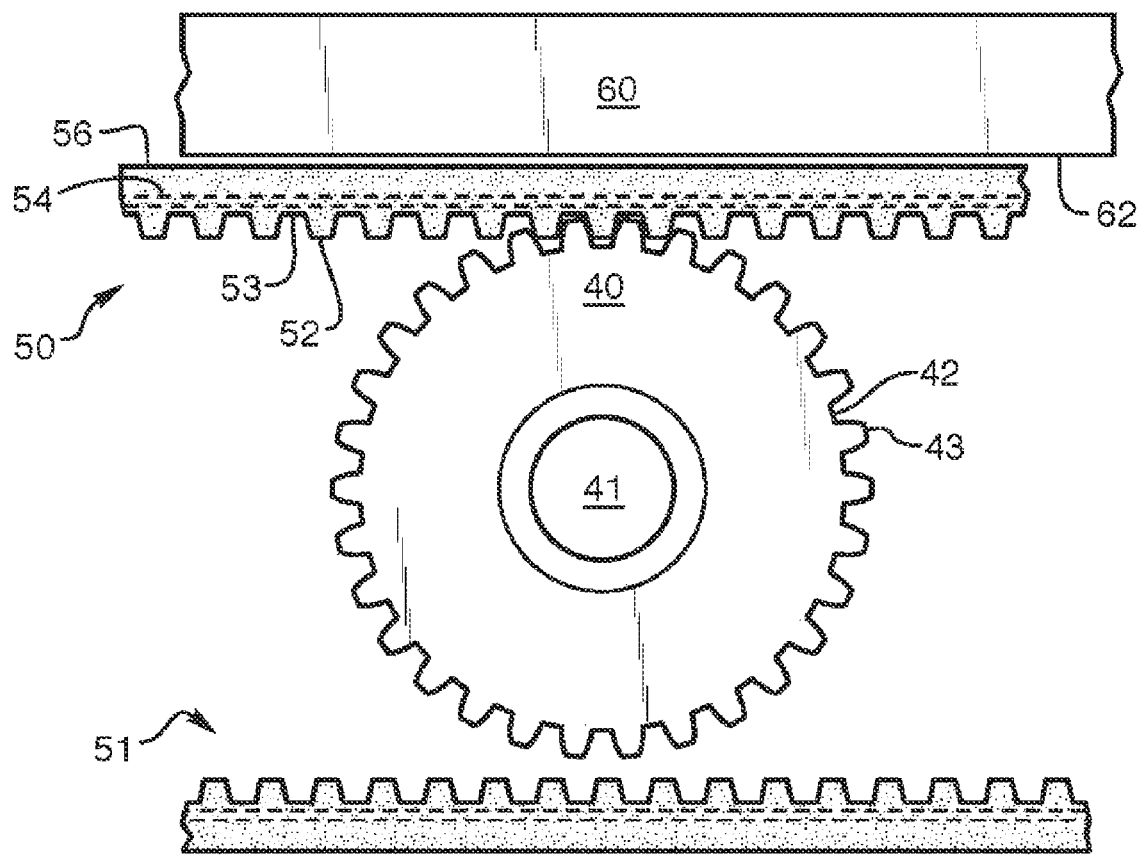
FIG. 5 is a schematic fragmentary view of a drive belt according to an embodiment of the invention.

With reference to FIG. 5, driven pulley 48 for driven roller assemblies 6 is characterized as a driven rotatable pulley. Driven pulley 48 has an outer circumferential periphery equipped with axially extending teeth 43 and grooves 42 (see FIGS. 4 and 5). It has an inner axial bore 41 (e.g., the inner surface of its hub) of a size permitting driven pulley 48 to slide axially over center shaft 30. Also, axial bore 41 of driven pulley 48 may be and helpfully is of slightly greater diameter than the diameter of center shaft 30. This facilitates a relatively low friction rotation of driven pulley 48 on center shaft 30. Driven pulley 48 further is equipped, with an annular ridge 46 having a radius at least as great as the radius of the outer tips of the axially extending teeth 43 of the pulley.

Belt 50 is driven by motors 29 coupled to, side walls 12 and 14 by motor mounts 49. Two motors 29 allow for various widths of conveyor 1 allowing for the transfer of various materials without replacing the motor. Further, the cost of an additional motor is comparable to the cost of a shaft coupling assembly. When compared, two lower power motors can provide the same amount of power as a single higher powered motor. Synchronization between motors 29 does not have to be exact, since rollers 35 are slip rollers.

It is noted, there are no special roller bearings or bushings in the compact structure for roller assembly 6 as it is formed according to an embodiment of this invention. Roller 35 of four-element driven roller assemblies 6 fits upon driven pulley 48. Roller 35 is basically pushed upon driven pulley 48. Roller 35 is held onto driven pulley 48 by a catch mechanism 33. Catch mechanism 33 essentially is a raised, portion of driven pulley 48 which extends into recessed portions 100 within center bore 102 within roller 35. When roller 35 is pushed onto driven pulley 48, recessed portions 100 would accept catch mechanisms 33 and provide enough resistivity to prevent roller 35 from being easily removed from driven pulley 48.

Slip roller assemblies 6 in embodiments of the present invention carry roller 35 on driven pulley 48 for slip friction rotation therewith. In this embodiment, roller 35 has an axial bore 102 somewhat larger in diameter than the circumferential outer peripheral surface of driven pulley 48, so contact between driven pulley 48 and roller 35 is not continuous around the circumference of driven pulley 48. This contact may be more or less limited to a line area (parallel to the shaft axis) extending along the uppermost portion of driven pulley 48 as it rests on the uppermost portion of center shaft 30. The friction between roller 35 and driven pulley 48 causes roller 35 to rotate with driven pulley 48 under normal circumstances and thus causes articles resting on roller 35 to be advanced along the length of conveyor pathway 3. The tendency of roller 35 to rotate in slip friction relationship with driven pulley 48 tends to increase in proportion to the downward force applied to roller 35 by the weight of any article carried by it. But roller 35 may slip on driven pulley 48; even to the extent roller 35 will remain stationary while driven pulley 48 continues to rotate. Thus, roller 35 may be prevented from rotating with driven pulley 48 by vectors of force applied to the outer annular surface of roller 35 greater in magnitude than the frictional relationship between driven pulley 48 and roller 35. It is when the force obstructing rotation exceeds the friction effecting rotation of roller 35 it will slip and not rotate in unison with driven pulley 48. The design of roller 35 is such it has an inner circular ring 36.

The drive system (see FIGS. 1 and 3) employs an endless drive belt 50, which is engaged with each of driven pulleys 48 along the entire drive run 59. Drive run 59 encompasses the series of driven roller assemblies 6 extending over the length of the conveyor (or conveyor section where a composite conveyor is made up of sections). By far the most common, endless drive belt 50 is one characterized as a positive drive belt. An illustrative positive drive belt is known as a "timing belt." Positive drive belts transfer the driving force of a driver pulley 40 to all driven pulleys 48 without relying solely upon a frictional relationship between the belt and the pulleys. Therefore, a positive drive belt is not as vulnerable to slippage, especially when the positive drive belt is maintained in a proper meshing relationship with the circumference of the pulleys.

An endless loop of positive drive belt generally has a rectangular transverse cross-section with opposite surfaces and opposite side edges. The positive drive surface of the belt most typically faces inward and has axially extending cogs or teeth 52 and grooves 53 between teeth 52. Teeth 52 and grooves 53 of belt 50 are suitably sized to properly mesh with grooves 42 and teeth 43 of driven pulleys 40. Teeth 52 and grooves 53 extend axially or laterally from inside edge 57 of the belt to the outside edge 58; this provides maximum tooth contact with a pulley for the width of the belt employed. Although timing belts are sometimes employed to drive pulleys synchronously (hence the name "timing" belt), complete synchronization with the pulleys is unnecessary. In fact, synchronization of slip, rollers would be difficult in view of the slip relationship between driven pulleys 48 and slip rollers 35.

A feature of the positive drive belt for the present invention is it is effective to transmit a driving force reliably over long drive runs 59, with driven pulleys 48 rotatably driven at substantially the same speed at all locations along the longitudinal length of drive run 59, more or less regardless of the length of a drive run 59 and regardless of the distance between the driver pulley and any driven pulley.

Back surface 56 opposite the drive or toothed surface 52 of the belt is characteristically smooth and continuous, and planar or flat along the belt's drive run. This flat condition for back surface 56 contributes to its easy and smooth sliding under anti-camming surface 62 of the guide strip 60 without producing excessive friction.

Positive drive belt 50 is most helpfully constructed with cords or filaments 54 (see FIG. 5) to enhance resistance to longitudinal stretch of belt 50. Filaments 54 extend perpendicular to transverse belt teeth 52. They extend along the longitudinal extent or direction of the loop of drive belt 50 and may be arranged contiguous (e.g., side by side) across the width of belt 50 between side edges 57, 58. Any suitable non-elastomeric filaments may be employed provided adhesion exists between them and the flexible (and even elastomeric) body material forming teeth 52 of belt 50. Filaments can be comprised of materials of the nylon family and include polyamides and aramides (aromatic polyamides) marketed under the name "Kevlar®", however, other materials can be used without departing from the spirit of the invention.

The drive train (e.g., driven pulleys 40 and belts 50) on a side wall 12, 14 may be driven by any suitable power source. An illustrative power source is an electric motor 29 located on both sides of pathway 3 of conveyor 1. Electric motor 29 can be a DC brushless motor; however, it is contemplated most any power source or motor could be used without departing from the spirit of the invention. The longitudinally endmost pulley of the bank of roller assemblies functions as driver pulley 40 for belt 50. The main driver pulley 40 has grooves and teeth of sufficient axial width to accommodate the width of drive belt 50. Driver pulley 40 drives drive belt 50, which in turn drives or rotates bank of driven pulleys 48 extending along the length of drive run 59.

Driver pulley 40 is driven by motor 29 through drive shaft 66 which is coupled to driver pulley 40 by a set screw 67. Driver pulley 40 draws or pulls a drive portion or drive run 59 of belt 50 toward itself over the uppermost portions of driven pulleys 40, and, belt 50 returns along a return run 51 (see FIG. 1) to the opposite end of bank of driven pulleys 40 along a path below driven pulleys 48. Drive run 59 is substantially straight in the lengthwise direction and meshes only with teeth 43 and grooves 42 on the uppermost portions of driven pulleys 40 (see FIG. 5). Drive run 59 thus remains in a tangential orientation to the circumferential outer periphery of the driven pulleys (except for the endmost pulleys).

Return run 51 of drive belt 50 need not be meshed or otherwise engaged with driven pulleys 48 for effective driving of driven pulleys 48. In fact, return run 51 is most helpfully kept away from engagement with driven pulleys 48 so as to, avoid any possible problems arising from incorrect meshing of return run 51 with lowermost teeth 43 and grooves 42 on driven pulleys 48. In some embodiments of the present invention, return run guides are provided at suitable intervals along the length of the return run to prevent belt 50 from coming into contact with the lowermost portions of driven pulleys 48. Return run guides are mounted on a side wall 12, 14 in positions away from teeth 43 on driven pulleys 48, but not so far from the pulleys tension imposed on belt 50 along its return run 51. These guides are cylindrical posts having rotating sleeve surfaces to lessen friction resulting from the belt coming into contact with the guide post. Thus, return run 51 may be substantially free of tension during operation of the conveyor 1.

Guide strip 60 can have an anti-caroming surface 62 on its underside to ensure a proper meshed relationship between belt 50 and driven pulleys 48 along drive run 59. Guide strip 60 can be constructed from a relatively low-friction organic plastic material of any suitable type. Illustratively, ultra high molecular weight (UHMW) polyethylene may be used. Depending on the plastic selected, the strip may be sufficiently stiff or rigid to maintain itself as a rigid guide. It may, however, be somewhat flexible or lacking in stiffness, in which case the strip may be maintained in its proper orientation with respect to drive belt 50 and the pulleys over long conveyor pathway lengths by the use of multiple fasteners to fix the longitudinal length of the strip on side wall 12, 14 or by employing a bracket or holder extending over the length of the strip.

Anti-camming surface 62 extends lengthwise along the length of drive run 59 and is positioned proximate to back surface 56 of drive belt 50 in a closely spaced or even touching relationship along drive run 59. When drive belt 50 is in a proper meshed relationship with the bank of pulleys, belt 50 is obstructed from "camming out", or being, moved out of the meshed relationship with the pulleys by the abutment of anti-camming surface 62 against drive belt back surface 56. "Camming out" of drive belt 50 on a pulley occurs when belt 50 moves in a radially outward direction from the pulley. Excessive radial movement by belt 50 may allow the belt teeth to ride up on the pulley teeth and skip or slip over the pulley teeth without imparting rotational motion to the pulley. The proximity of anti-camming surface 62 to the back surface 56 (see FIG. 5) obstructs or blocks excessive radial movement by belt 50 away from the pulley and thereby prevents any substantial unmeshing of belt 50 from the pulley (and any resulting slippage). Back surface 56 of belt 50 does not have significant contact with anti-camming surface 62 when belt 50 is fully meshed with the pulley.

The anti-camming surface is flat and smooth along its lateral and lengthwise extents and normally performs to give only radial guidance to belt 50, with no significant lateral guidance provided to belt 50. Lateral guidance at the outside edge of belt 58 is provided by the side wall.

Lateral belt guidance for the inside edge 57 of belt 50 is provided by flange 71. By positioning driven pulleys 48 adjacent side walls 12, 14, the added function of guiding, outside edge 58 of belt 50 is performed by side walls 12 and 14. Side walls 12 and 14 prevent significant outside axial or lateral movement of belt 50 with respect to driven pulley 48. Also, anti-camming surface 62 may perform its function more efficiently under the relationships illustrated.

The open pathway between the opposing banks of slip roller assemblies permits work stations to be simply integrated without requiring specialized or customized changes to the conveyor structures. For example, a product carrier docking station 10 may be "piggybacked" onto a basic conveyor segment without altering the basic functioning or structure of the conveyor. The docking station 10 stops and lifts an individual carrier 8 into an elevated stationary position so a required task can be performed on an article or product carried on the carrier 8. The docking station 10 is comprised of opposing horizontally cantilevered docking plates 72 and 74 extending over the opposite side walls of the conveyor toward each other and substantially over the slip roller assemblies. The plates 72, 74 do not meet in the middle but extend far enough so their innermost reaches will intercept or block the outer lateral portions of a carrier 8 as it is raised up and off the roller assemblies.

A metering stop 78 mounted just upstream of the docking station 10 and between the opposing banks of roller assemblies includes a stop pin 80 mounted on a pneumatic ram (not shown) below the pathway. The ram raises the stop pin 80 into a position where it can arrest or block forward movement of a carrier. The stop pin 80 may be cushioned by a shock absorber to prevent impact with the stop pin from excessively jarring the carrier 8. As the carrier arrives at the raised stop pin 80, a sensor 76 mounted adjacent to the metering stop 78 senses the presence of the carrier. A sensor is constructed with fiber optic materials and has an integral light source, and light detector to detect light reflected off the bottom of a carrier passing above the sensor. Other sensors may be used as well such as proximity and mechanical sensors, without departing from the spirit of the invention. If the docking station is able to receive the carrier (e.g., no other carrier is at the docking station), the metering stop ram retracts the stop pin 80 to allow the carrier to proceed into the docking station 10. Another sensor and metering stop are mounted just inside the downstream end of the docking station to stop the carrier in the appropriate position in the station for lifting. Situated below the docking plates 72, 74 are an elevating ram 84 may be raised above the top of the roller assemblies to lift the carrier off the slip rollers and into a docked relationship with the docking plates. The docking plates have locating pins 86, 87 (shown only on the docking plate 72) with conical ends depending from the bottom of the plates. The pins 86, 87 insert into similarly sized locating holes 88, 89 in the upper surface of the carrier as the carrier is raised. These pins serve to accurately locate and rigidly hold the carrier against lateral movement when it is docked. Operations may be performed upon the product or articles carried on the carrier at this point. When such operations are finished, the elevating ram 84 is lowered and the carrier conies to rest on the slip rollers. The docking station metering stop, pin is then lowered and the carrier moves on the slip rollers along the pathway. If a carrier arrives at the docking station while another carrier is docked, the stop pin 80 will hold the carrier outside the docking station until the docked carrier has cleared the station.

Thus, embodiments of the SLIP ROLLER CONVEYOR are disclosed. One skilled in the art will appreciate the present teachings can be practiced with embodiments other than those disclosed. The disclosed embodiments are presented for purposes of illustration and not limitation, and the present teachings are limited only by the claims follow.

What is claimed is:

1. A conveyor, comprising:
    a) a pair of laterally spaced side walls extending in a lengthwise direction of a conveyor pathway, each said side wall having an inside surface facing said pathway and an outside surface facing away from said pathway;
    b) a plurality of driven roller assemblies mounted on said side walls in spaced relationship and at uniform height along the lengthwise direction of said pathway, each said driven roller assembly comprising:
        i) a center shaft mounted in the side wall so said center shaft is fixed against rotation and projects perpendicularly inward from the inside surface of the side wall, said center shaft being characterized by having a socket head;
        ii) a driven pulley having an outer flange, an inner axial bore of a size permitting said driven pulley to slide axially over the center shaft, said driven pulley being mounted on said center shaft in a manner allowing rotation of said driven pulley;
        iii) a roller carried on said driven pulley for rotation therewith to move articles resting on said roller down said pathway, said roller having a recess for engaging a catch on the driven pulley to hold the roller securely; and
    c) a drive system including an endless drive belt engaged with said driven pulleys to effect rotation thereof.

2. The conveyor of claim 1, wherein said mounting of center shaft in said side wall comprises a threaded mounting and said socket head of said shaft is engageable by a wrench for easy removal and replacement.

3. The conveyor of claim 1, wherein said driven pulley comprises plastic material.

4. The conveyor of claim 1, wherein said roller carried on said sleeve section is a slip roller mounted for slip friction rotation with respect to said driven pulley and subject to non-rotation therewith when the force obstructing rotation of said slip roller exceeds the friction effecting rotation of said slip roller on said driven pulley.

5. The conveyor of claim 1, wherein the socket head of the center shaft is covered by the roller.

6. The conveyor of claim 1, wherein the driven pulley has teeth separated by grooves around the outer periphery of the driven pulley.

7. The conveyor of claim 6, wherein the endless drive belt has teeth separated by grooves, the grooves coinciding with the pulley teeth.

8. A roller conveyor, comprising:
    a) a pair of laterally spaced side walls extending in a lengthwise direction of a conveyor pathway,
    b) a plurality of driven roller assemblies mounted on each said side wall along the lengthwise direction of said pathway, each said driven roller assembly comprising:
        i) a center shaft mounted in the side wall to project perpendicularly inward from an inside surface of the side wall;
        ii) a driven pulley having axially extending teeth and grooves in its circumferential outer periphery;
        iii) a lip portion on the driven pulley for mounting the driven pulley between the center shaft and the inner surface of the side wall;
        iv) a roller operably coupled on said driven pulley for rotation therewith to move articles resting on said roller down said pathway; and
    c) a drive system including an endless positive drive belt having an outside edge and a positive drive surface formed of transverse teeth and grooves which mesh with the axially extending teeth and grooves of said driven rotatable pulleys along a straight drive run.

9. The roller conveyor of claim 8, further comprising a center bore within the roller having a recessed portion along a circumference of the center bore.

10. The roller conveyor of claim 9, further comprising a catch mechanism along a circumference of the driven pulley.

11. The roller conveyor of claim 10, wherein the catch mechanism operably couples with the recessed portion to retain the roller on the driven pulley.

12. The roller conveyor of claim 8, further comprising a flange on the driven pulley for coupling the drive belt between the flange and the inner surface of the side wall.

13. The roller conveyor of claim 8, wherein the belt can have a backing surface of substantially smooth character such that said backing surface provides a substantially flat plane along a length of said straight drive run, said drive run of said drive belt being adjacent the inside surface of said conveyor side wall, the outside edge of said drive belt being in adjacent relationship to and guided by the inside surface of said conveyor side wall.

14. A slip roller conveyor, comprising:
 a) a pair of laterally spaced parallel side walls extending in a lengthwise direction of a conveyor pathway;
 b) a plurality of driven slip roller assemblies mounted on at least one the pair of side walls; each said driven slip roller assembly comprising:
  i) a non-rotatable center shaft coupled to the side wall projecting perpendicularly inward from an inside surface of the side wall;
  ii) a rotatable pulley having axially extending teeth and grooves and having an inner axial bore of a size permitting said rotatable pulley to slide axially over said center shaft;
  iii) a slip roller carried on said rotatable pulley for slip friction rotation therewith subject to non-rotation therewith when a force obstructing rotation of said slip roller exceeds a friction effecting rotation of said slip roller; and
  iv) the center shaft holding upon it the rotatable pulley pinched between the inside surface of the side wall and the center shaft and the slip roller coupled to the rotatable pulley; and
 c) a drive system including an endless positive drive belt having an inside edge and an outside edge and a positive drive surface therebetween.

15. The slip roller conveyor of claim 14, further comprising a center bore within the slip roller having a recessed portion along a circumference of the center bore.

16. The slip roller conveyor of claim 15, further comprising a catch mechanism along a circumference of the rotatable pulley.

17. The slip roller conveyor of claim 16, wherein the catch mechanism operably couples with the recessed portion to retain the roller on the rotatable pulley.

18. The slip roller conveyor of claim 14, further comprising a lip portion on the rotatable pulley for mounting the rotatable pulley between the center shaft and the inner surface of the side wall.

19. The slip roller conveyor of claim 14, further comprising a flange on the rotatable pulley for coupling the rotatable pulley between the flange and the inner surface of the side wall.

* * * * *